United States Patent
Bradford, III et al.

(10) Patent No.: US 6,932,112 B2
(45) Date of Patent: Aug. 23, 2005

(54) MULTIPLE PORT VALVE

(76) Inventors: Lawrence J. Bradford, III, 3211 Circle Oak Dr., Atlanta, GA (US) 30339; Rocky R. White, 1201 Oak Rd., Lilburn, GA (US) 30047

( * ) Notice: Subject to any disclaimer, the term of this patent is extended or adjusted under 35 U.S.C. 154(b) by 244 days.

(21) Appl. No.: 10/227,712

(22) Filed: Aug. 26, 2002

(65) Prior Publication Data

US 2004/0035475 A1 Feb. 26, 2004

(51) Int. Cl.$^7$ .......................... F16K 11/02; F16K 37/00
(52) U.S. Cl. ..................... 137/625.11; 137/625.46; 137/554
(58) Field of Search ................. 137/554, 625.11, 137/625.46

(56) References Cited

U.S. PATENT DOCUMENTS

| | | | | |
|---|---|---|---|---|
| 282,313 | A | * 7/1883 | Haynes | 137/625.46 |
| 1,044,479 | A | * 11/1912 | Blair | 137/625.11 |
| 1,292,138 | A | 1/1919 | Sullivan et al. | |
| 2,834,376 | A | 5/1958 | Hughes | |
| 2,840,109 | A | 6/1958 | Wadleigh | |
| 2,888,098 | A | 5/1959 | Florence | |
| 2,940,473 | A | 6/1960 | Smith | |
| 2,974,681 | A | * 3/1961 | Whitehurst | 137/625.11 |
| 3,207,180 | A | * 9/1965 | Mercier | 137/625.46 |
| 3,246,572 | A | 4/1966 | Ogilvie | |
| 3,405,734 | A | * 10/1968 | Gerrit et al. | 137/625.46 |
| 3,640,310 | A | * 2/1972 | Erlich | 137/625.46 |
| 3,757,583 | A | 9/1973 | Ludewig, Jr. | |
| 3,802,782 | A | 4/1974 | Natelson | |
| 3,840,046 | A | 10/1974 | Busquets | |
| 4,195,665 | A | 4/1980 | Nolan et al. | |
| 4,310,022 | A | 1/1982 | Cohen | |
| 4,604,093 | A | 8/1986 | Brown et al. | |
| 4,632,148 | A | 12/1986 | Stark, Sr. et al. | |
| 5,316,042 | A | * 5/1994 | Lim et al. | 137/625.11 |
| 5,542,451 | A | 8/1996 | Foster | |
| 5,584,322 | A | 12/1996 | Poschl et al. | |
| RE35,866 | E | 8/1998 | Simmons | |
| 5,848,610 | A | 12/1998 | Livernash et al. | |
| 6,098,646 | A | * 8/2000 | Hennemann et al. | 137/625.11 |
| 6,293,305 | B1 | 9/2001 | Soares | |
| 6,345,645 | B1 | 2/2002 | Kenna et al. | |
| 6,352,105 | B1 | 3/2002 | Serratto | |
| 2001/0052355 | A1 | 12/2001 | Hoenisch et al. | |

* cited by examiner

Primary Examiner—John Rivell
(74) Attorney, Agent, or Firm—Merchant & Gould

(57) ABSTRACT

A valve configured to receive a fluid, such as ambient air, from one or more sources and distribute the fluid to one or more outlet ports selected from a plurality of outlet ports. The valve includes a first and second member forming a cavity that contains a rotational disk used to directed a fluid through one or more outlet ports located in the second member. The first member includes a distribution chamber for receiving the fluid from an inlet port and for distributing the fluid to the rotational disk. The rotational disk may be controlled using a motor and sensor to align one or more apertures in the disk with one or more selected output ports in the second member. Thus, a fluid may be directed from a single distribution chamber to one or more selected outlet ports.

23 Claims, 7 Drawing Sheets

Detail 7

MULTIPLE PORT VALVE

FIELD OF THE INVENTION

The invention is directed generally to multiple port valves, and more particularly, to multiple port valves for distributing air in airlift systems.

BACKGROUND

A popular conventional method for moving fluids from one point to another through a conduit is through use of a pump; however, fluids may be transferred through conduits using other systems. For instance, fluids may be transferred through conduits using ambient air or other gases to push dense liquids through a conduit. One such system using ambient air to displace dense liquids through conduits is often referred to as an airlift system. In an airlift system, air is pumped into conduits filled with a dense liquid at certain locations in a system to force the dense fluids to move through the conduit to a desired endpoint. Many airlift systems involve distributing air to various parts of the systems at different times in varying amounts. Thus, a need exists for a device capable of reliably distributing air to multiple locations within an airlift system at different times.

Multiple port valves have been formed from a variety of configurations and used in many different applications for a variety of purposes. For instance, multiple port valves have included designs having a plurality of inlets coupled to a single outlet. On the other hand, some multiple port valves receive fluids from a single supply source and distribute the fluids to a plurality of different sources. For example, U.S. Pat. No. 6,345,645 to Kenna et al. discloses a multiple port valve for distributing water from a recirculating pump of a swimming pool to selected outlets for operating banks of cleaning heads in swimming pools. In addition, U.S. Pat. No. 5,542,451 to Foster discloses a multiple port valve for distributing water to a plurality of output ports in an aquarium. Furthermore, multiple port valves have been used in various industries, such as the petroleum industry, the healthcare industry, the residential pool industry, the water supply industry and various other industries. However, even with the application of multiple port valves across such a diverse collection of industries, there still exists a need for a reliable multiple port valve capable of distributing fluids, such as gases, to one of a plurality of destinations without leakage to other outlet ports.

SUMMARY OF THE INVENTION

This invention is direct to multiple port valves capable of receiving fluids from one or more sources and distributing the fluids to one or more destinations through a plurality of outlet ports. The valves are capable of distributing fluids, such as, but not limited to: gases, such as ambient air, oxygen, and other gases; and liquids, such as distilled water, tap water and other liquids. The valves include a first valve body member and a second valve body member that form an internal cavity containing a rotational disk for controlling distribution of a fluid to one or more of the plurality of outlet ports. The first valve body member includes a distribution chamber for receiving a fluid from an inlet port. In one embodiment, the distribution chamber has a toroidal shape, but may have other shapes in other embodiments. The rotational disk includes one or more apertures sized to allow a fluid to pass from the distribution chamber formed by the rotational disk and the first valve body member to one or more of the outlet ports. In one embodiment, the rotational disk has a single aperture sized and positioned to align with a single outlet port.

The valves may also include a motor for rotating the rotational disk and aligning the one or more apertures in the rotational disk with one or more outlet ports selected from the plurality of outlet ports. The motor may be controlled manually or with an electric device, which may or may not be programmable, such as, but not limited to, a microcontroller or computer. The valves may include a gear box for reducing the rotational speed of the drive shaft of the motor and increasing the torque produced by the motor.

Seals are used for sealing the rotational disk to the first and second valve body members. Specifically, an inner seal and an outer seal are positioned between the first valve body member and the rotational disk to seal the distribution chamber to the rotational disk. The inner seal has an outside diameter that is slightly less than the inner diameter of the distribution chamber, and the outer seal has an inner diameter that is slightly larger than the outside diameter of the distribution chamber. This configuration prevents a fluid that entered the distribution chamber through the inlet port from exiting the distribution chamber except through the one or more apertures located in the rotational disk. In one embodiment, each outlet port is sealed individually to the rotational disk using individual outlet port seals. This configuration allows a fluid to be sent to an individual outlet port without allowing the fluid to be sent to the other outlet ports located in the second valve body member. Such a configuration is ideally suited for use with an airlift system.

The first and second valve body members include recesses for keeping the seals located in the appropriate positions to maintain a predetermined amount of pressure loading on the rotating disk, and for reducing wear on the seals. The seals may have numerous designs; however, in one embodiment, the seals have a Y-shaped cross-section, which is rotated approximately 90 degrees from a conventional Y-shaped position. The recesses preferably are sized so that the forces exerted on the inner and outer seals by one side of the rotational disk and the first valve body member are approximately equal to the forces exerted on the outlet port seals by the other side of the rotational disk and the second valve body member. This balancing of forces on the seals keeps the seals on one side of the rotational disk from undergoing premature wear relative to the seals on the other side, so as to provide maximum life of the seals and increase the efficiency of the valve.

An advantage of this invention is that the valves are capable of distributing a fluid from one or more sources to one or more selected outlet ports chosen from a plurality of outlet ports without the fluid leaking to other outlet ports.

Another advantage of this invention is that the forces exerted on the seals located on opposite sides of a rotational disk are approximately balanced, which reduces wear of the seals and reduces the amount of torque required to rotate the rotational disk, and prevents premature breakage of the valve.

These and other features and advantages of the present invention will become apparent after review of the following drawings and detailed description of the disclosed embodiments.

DETAILED DESCRIPTION OF PREFERRED EMBODIMENT

Figure 1:
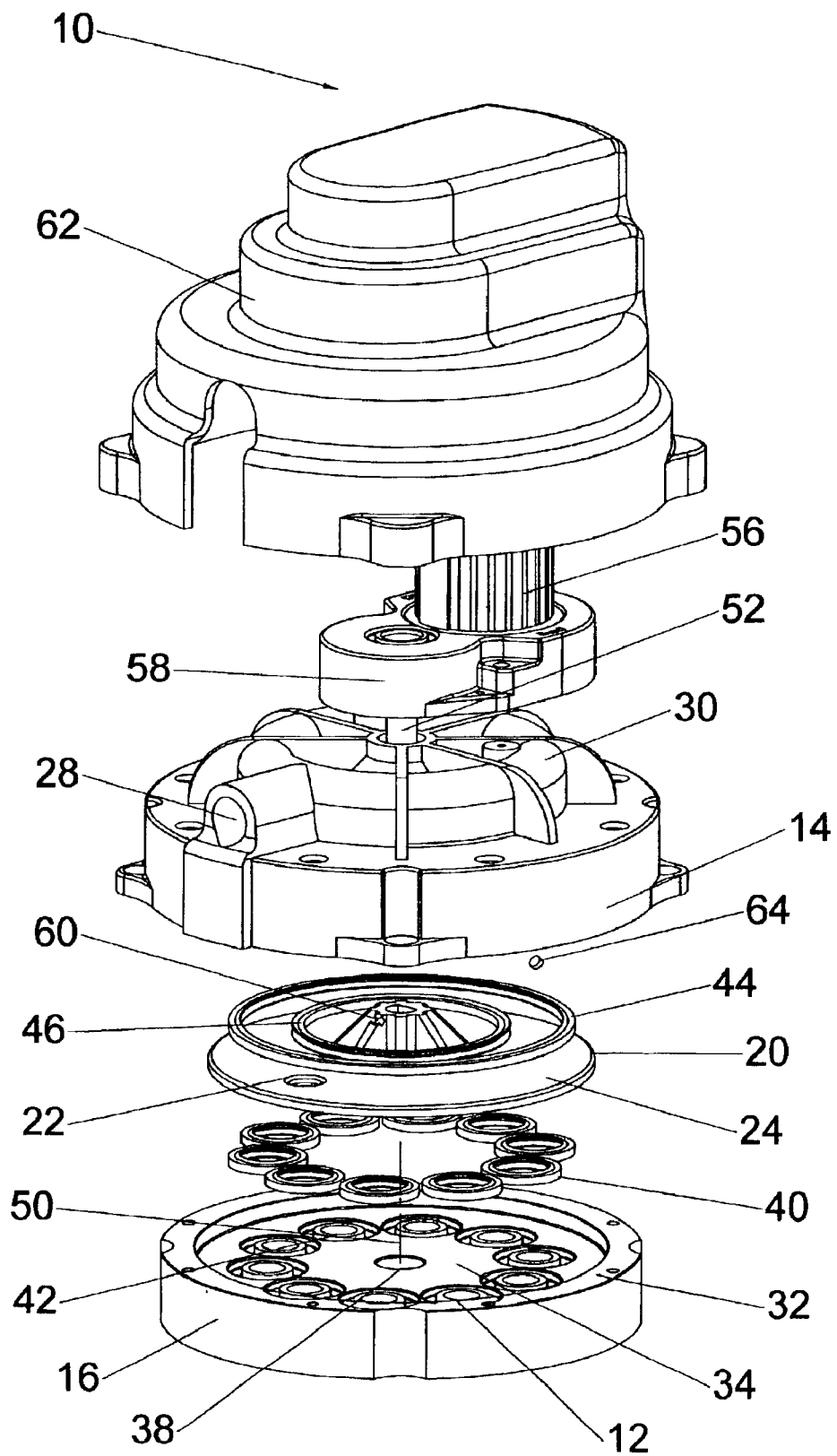
FIG. 1 is an exploded perspective view of a valve according to a preferred embodiment of this invention.

FIG. 1 depicts a valve 10 according to one embodiment of this invention. The valve 10 is sometimes referred to as a multiple port valve and is used for receiving fluids from one or more sources and distributing the fluids through one or more outlet ports 12. Valve 10 may be used to transfer various fluids, such as, but not limited to, gases such as ambient air, oxygen, nitrogen, and other gases; and liquids, such as distilled water, tap water, and other fluids.

The valve 10 is composed of a first valve body member 14 and a second valve body member 16, which couple together to form the valve housing and an internal cavity 18 within the valve housing. Internal cavity 18 is sized to contain and position a rotational disk 20 for directing a fluid to one or more outlet ports 12 chosen from a plurality of outlet ports. Rotational disk 20 includes one or more apertures 22 radially spaced from the axis of rotation of the disk and sized to allow a fluid to pass from a top surface 24 of the rotational disk to a bottom surface 26 of the rotational disk. In this configuration, valve 10 is capable of receiving a fluid through inlet port 28 and directing the fluid to one or more outlet ports 12 by positioning aperture 22 of rotational disk 20 proximate to a selected outlet port. Rotational disk 20 prevents a fluid from flowing from inlet port 28 to one or more outlet ports 12 without passing through aperture 22. Thus, rotational disk 20 controls through which outlet port 12 a fluid flows.

Figure 2:
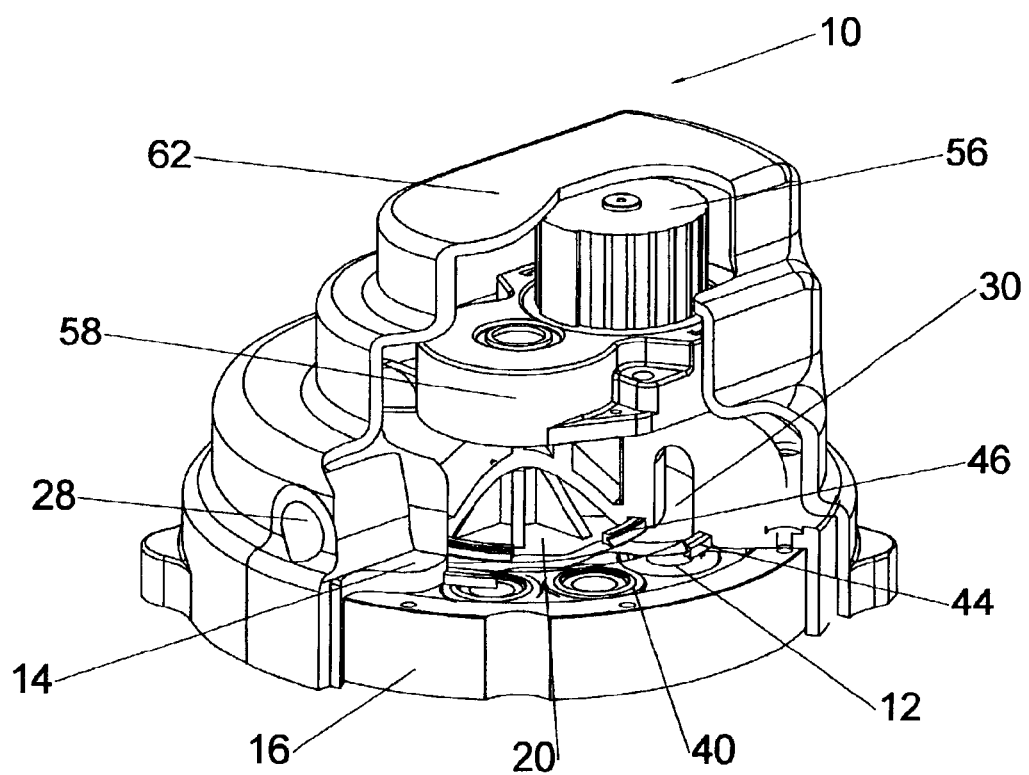
FIG. 2 is a perspective view, with a partial-cut away section, of the valve shown in FIG. 1.
Figure 3:
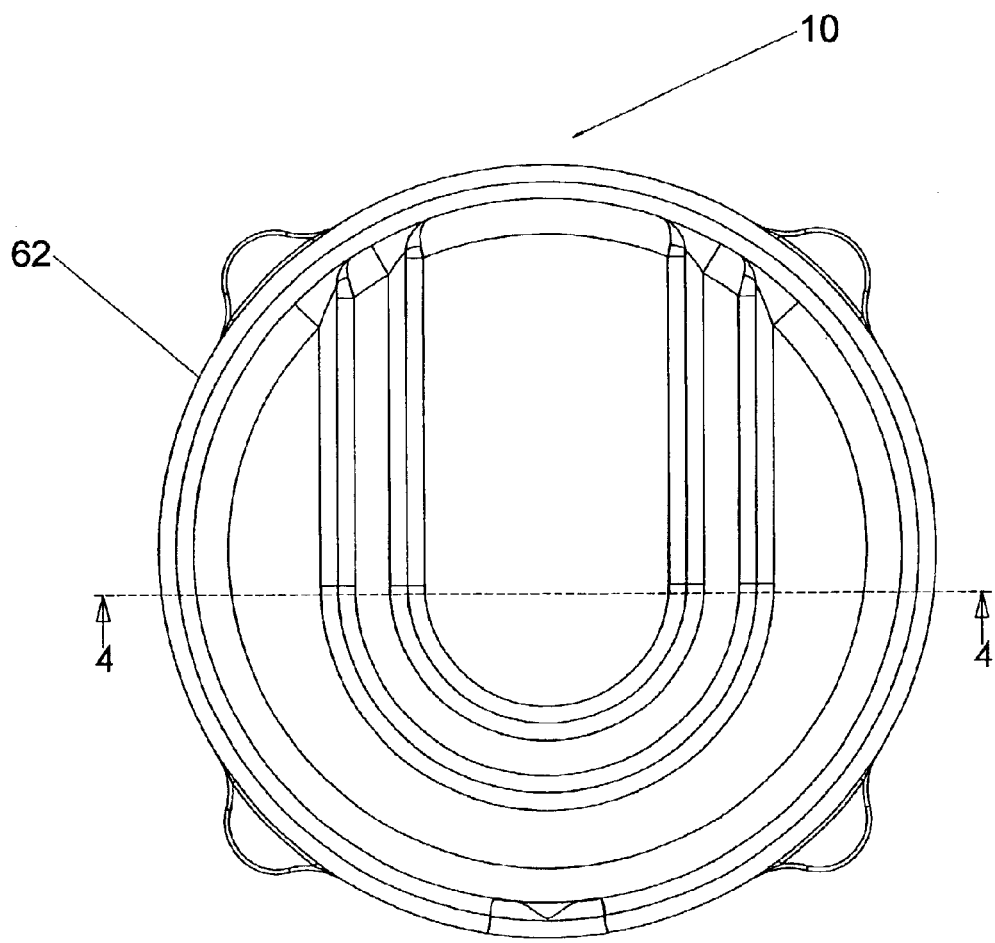
FIG. 3 is a top view of the valve shown in FIG. 1.
Figure 4:
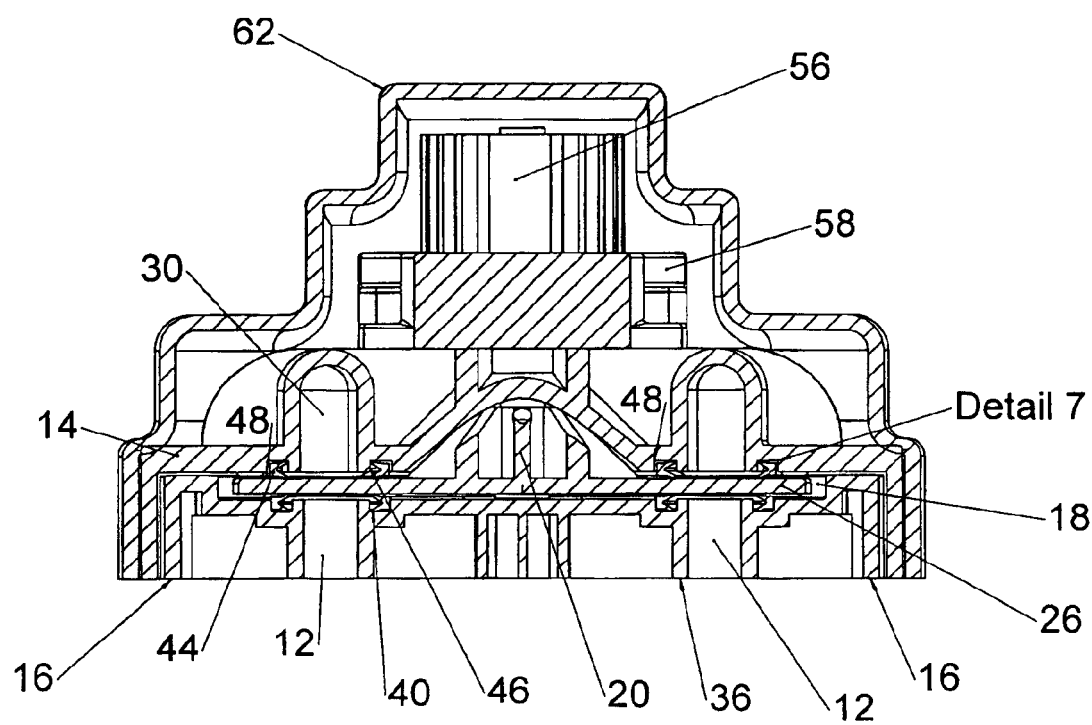
FIG. 4 is a cross-section of the valve shown in FIG. 1 taken at reference line 4-4 of FIG. 3.

The first valve body member 14 includes an annular distribution chamber 30 within the internal cavity 18, as shown in FIGS. 2 and 4, for receiving a fluid from one or more inlet ports 28. Although FIG. 1 shows first valve body member 14 as having a single inlet port 28 communicating with the distribution chamber, the invention is not limited to this configuration. Rather, the first valve body member 14 may have one or more inlet ports 28 in fluid communication with distribution chamber 30.

Distribution chamber 30 may take the form of various configurations or shapes. In one embodiment, distribution chamber 30 is generally toroidal shaped in section, as shown in FIGS. 1 and 4. However, the distribution chamber is not limited to this shape, but may have a rectangular, square, polygonal, or other shape. The shape of the distribution chamber 30 is a function of the diameter and radial position of aperture 22 on the rotational disk 20. Specifically, the distribution chamber 30 should be shaped so that the width of the distribution chamber is in fluid communication with the aperture 22 as the rotational disk 20 rotates relative to the distribution chamber. Because the disclosed embodiment of the valve is intended for distributing a volume of air at a rate of flow suitable for operating an airlift system as will be understood by those skilled in the art, the volume of the distribution chamber 30 should be sufficient to maintain that flow of air through the valve. Accordingly, the volume of the distribution chamber 30 preferably should be sufficient to buffer incoming fluid flow through the inlet port 28 and to maintain a substantially constant rate of flow through the valve 10 with little or no pressure drop or reduction in rate of fluid flow resulting from the presence of the valve.

The height of the distribution chamber 30 in the disclosed embodiment affects the maximum flow rate and corresponding pressure drop through the valve 10. Increasing the height of the distribution chamber increases the flow rate and reduces pressure drop within the valve, and vice versa. For an air valve intended for use in a system including one or more air lifts as discussed above, it is preferred to configure the distribution chamber so that the flow and air pressure are substantially unaffected by the presence of the valve 10 in the system.

The first valve body member 14 is configured to be coupled to the second valve body member 16 to form the internal cavity 18, as shown in FIG. 4. First valve body member 14 and second valve body member 16 may be coupled together in numerous manners. In one embodiment, first valve body member 14 is coupled to second valve body member 16 using screws. However, the first and second valve body members may be coupled together with devices, such as, but not limited to, clamps, adhesives, snap-in retaining elements molded into the body members, and other connection devices.

A ledge surface 32 (FIG. 1) is formed around the periphery of the second valve body member 16. The ledge surface extends upwardly, as viewed in that figure, from the upper side of the second valve body member 16 to fit within a corresponding recess formed in the facing lower side of the first valve body member 14, as best seen in FIGS. 1 and 4. The height of the ledge surface 32 of the second valve body member determines the amount of force exerted by the rotational disk 20, the first valve body member 14 and the second valve body member 16 on outer seal 44, inner seal 46, and outlet port seals 40. If the height of the ledge surface 32 is increased relative to the interior surface 34 of the second valve member 16, the spacing between the seals and the rotational disk 24 increases and the amount of force exerted on the seals by the rotational disk thus decreases, and vice versa.

Figure 6:
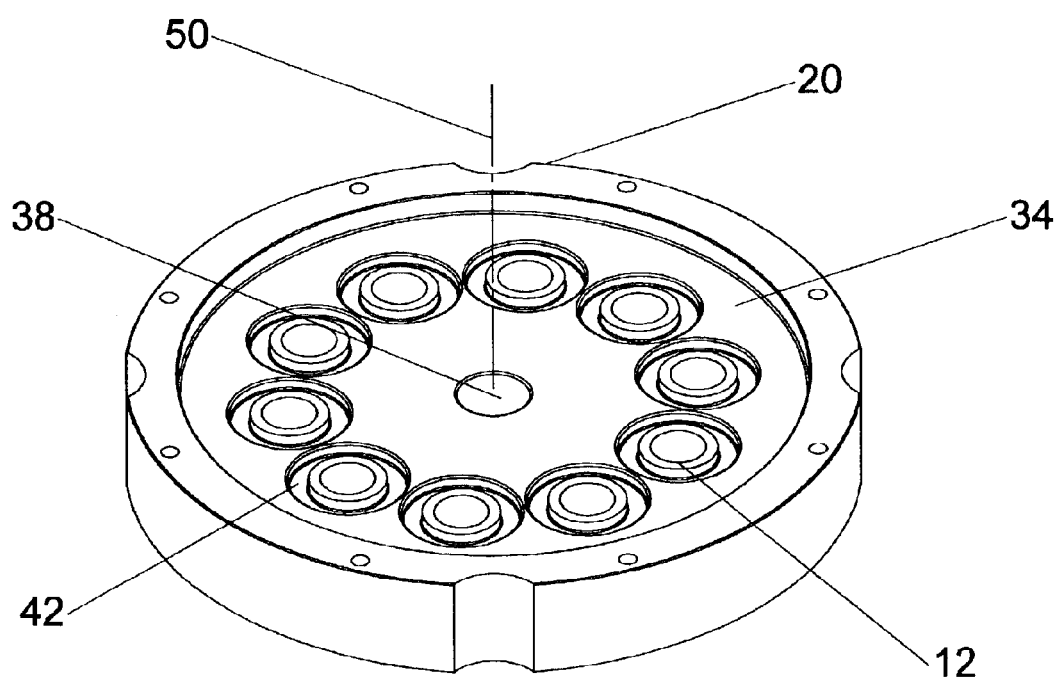
FIG. 6 is a perspective view of a second valve body member that is used to form a portion of the valve of FIG. 1.

The second valve body member 16 includes a plurality of outlet ports 12, which are ten in number in the disclosed embodiment, as shown in FIG. 6, although it should be understood that a greater or lesser number of outlet ports may be provided as required by a particular application. The outlet ports 12 extend through second valve body member 16 from an interior surface 34 to an exterior surface 36. Outlet ports 12 may be positioned in second valve body member 16 in numerous configurations. The limiting factor for positioning the outlet ports 12 in second valve body member 16 is that the outlet ports be located for fluid communication with the one or more apertures 22 of the rotational disk 20 as the disk is turned on its axis of rotation. In the disclosed embodiment, the second valve body member 16 includes ten outlet ports 12 positioned equidistant from a point on the second valve body member in the center of axial hole 38, FIG. 6, with which the rotational disk is axially aligned, so that the outlet ports are disposed on an annular path on the second valve body member.

Figure 5:
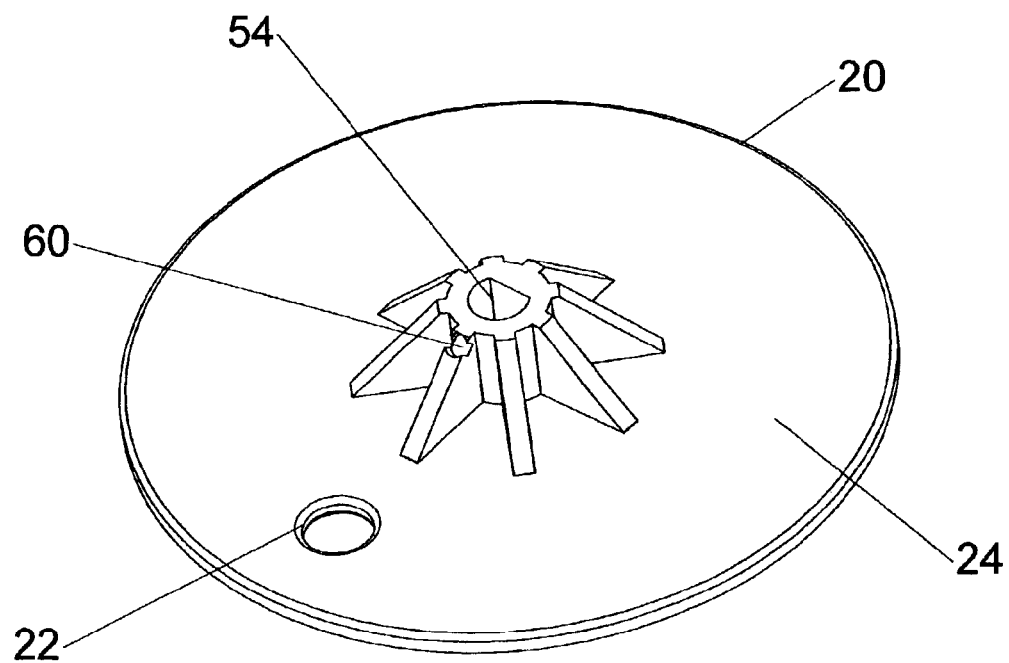
FIG. 5 is a perspective view of a rotational disk usable in the valve shown in FIG. 1.

The rotational disk 20 is positioned in an internal cavity 18 formed between first valve body member 14 and second valve body member 16, as shown in FIG. 4, and is capable of being rotated about a longitudinal axis 50. The rotational disk 20 may have an integral shaft or may be coupled to a drive shaft 52 engaging a central aperture 54 of the rotational disk. Rotational disk 20, as shown in FIGS. 1 and 5, includes at least one aperture 22 for allowing a fluid to pass from distribution chamber 30 to outlet ports 12. In one embodiment, rotational disk 20 includes a single aperture 22 radially positioned to align sequentially with the outlet ports 12 as the rotational disk is rotated. However, other embodiments may include two or more apertures 22, shaped and positioned to align concurrently with two or more selected outlet ports 12, thereby directing fluid flow concurrently to two or more outlet apertures at each rotational position of the disk. The rotational disk 20 thus controls the flow of fluids from distribution chamber 30 to one or more outlet ports. Specifically, the rotational disk 20 may be rotated by the drive shaft 52 along longitudinal axis 50 until the aperture 22 is positioned proximate to a selected outlet port 12 through which a fluid is intended to be sent. The faces of the rotational disk have a smooth finish to reduce frictional drag and consequent wear on the seals.

The rotational disk 12 may be rotated in this manner by a variety of techniques, such as but not limited to, manual, mechanical, or other such methods. In the disclosed embodiment, a motor 56, as shown in FIG. 1, is coupled to drive shaft 52 for rotating the rotational disk 20 and aligning the aperture 22 with a selected outlet port 12. Motor 56 may be, but is not limited to, an electric stepper motor or the like. Electric stepper motor 56 is coupled to the rotational disk 20 through a gear box 58 for reducing the rotational speed of the drive shaft 52 and increasing the torque applied to that drive shaft, so that a smaller motor may be used than if gear box 58 were not used. The motor 56 may be protected using a cover 62 sized to fit over motor 56 and attach to first valve body member 14.

A sensor 64, shown in FIG. 1, may be included in the housing of valve 10 for sensing the position of aperture 22 and positioning that aperture proximate to one of the plurality of outlet ports 12. The sensor 64 preferably is mounted in fixed position relative to the first valve body member 14 or the second valve body member 16, and may be any sensor capable of sensing the rotational position of the disk or the position of the aperture 22. In the disclosed embodiment, sensor 64 is a Hall-effect sensor disposed within the first valve body member to detect a magnetic sensing element 60, FIGS. 1 and 5, located on and moving with rotation of the rotational disk 20.

The valve 10 further includes seals, as shown in FIGS. 1, 2, and 4, for sealing the distribution chamber 30 to the rotational disk 20 and for sealing the rotational disk relative to the outlet ports 12. Valve 10 also includes an outlet port seal 40 positioned proximate to each outlet port 12 for providing a fluid-tight seal between the bottom surface 26 of the rotational disk 20 and each individual outlet port. In this configuration, a fluid is able to pass through aperture 22 and into a selected outlet port 12 without leaking and entering another outlet port. Thus, a fluid is sent from the inlet port 28 to a single outlet port 12, selected by the rotational position of the rotational disk 20 without the fluid entering another outlet port 12. In one embodiment, outlet port seals 40 may have a circular shape. However, other embodiments of valve 10 may include seals having other shapes and configurations. Second valve body member 16 may also include recesses 42 for receiving outlet port seals 40. Recesses 42 may be positioned around outlet ports 12 for keeping outlet port seals 40 positioned properly around the outlet ports. Recesses 42 may be any shape and may take the shape of the exterior shape of outlet port seals 40. In the disclosed embodiment, recesses 42 are circular in shape.

Figure 7:
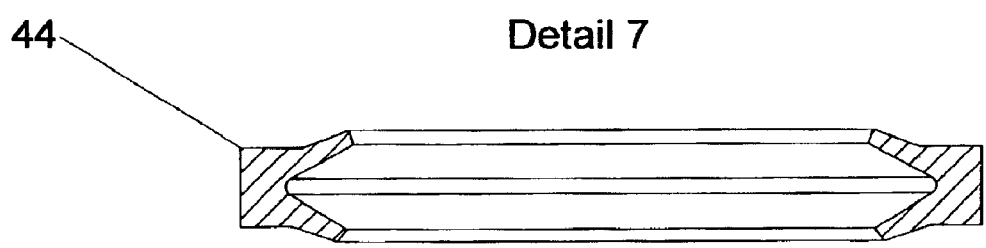
FIG. 7 is a enlarged detail of a cross-section of one embodiment of seals used in the valve embodiment shown in FIG. 6.

The valve 10 also includes seals positioned between rotational disk 20 and first valve body member 14 for sealing distribution chamber 30 to rotational disk 20. In the disclosed embodiment, an outer seal 44 and an inner seal 46 are positioned between first valve body member 14 and rotational disk 20. Outer seal 44 is preferably sized to have an inside diameter slightly larger than the outer diameter of distribution chamber 30, and inner seal 46 is sized to have an outside diameter slightly less than the inside diameter of the distribution chamber. First valve body member 14 includes recesses 48 for receiving inner seal 46 and outer seal 44 and securing these seals in position relative to the distribution chamber 30. Recesses 48 may be any shape and may take the shape of the exterior shape of inner seal 46 and outer seal 44. In the disclosed embodiment, recesses 48 are circular in shape and have approximately rectangular cross-sectional shapes complementary to the shapes of the seal portions accommodated therein. The outer extent of the seals in the disclosed embodiment have a generally Y-shaped cross-section as shown in FIG. 7.

Outlet port seals 40, outer seal 44 and inner seal 46 may have numerous configurations. In one embodiment, outlet port seals 40 may have a generally toroidal shape, as shown in FIG. 7, which is referred to as a Y-shaped cross-section. FIG. 7 is an enlarged detail of outer seal 44. However, outlet port seals 40, outer seal 44 and inner seal 46 may have an identical cross-section to the shape shown in FIG. 7. Seals 40, 44, and 46 are not limited to this design. Rather, seals 40, 44, and 46 may have circular, rectangular, square, polygonal or other shaped cross-sections. Seals 40, 44 and 46 are composed of wear resistant materials such as, but not limited to, rubber, silicone, oil-impregnated plastics, and the like.

Seals 40, 44, and 46 may also be made of ceramic materials having various shapes. In one embodiment, seals 40, 44, and 46 are circular with flat surfaces that contact rotational disk 20. The flat surfaces of seals 40, 44 and 46 have a polished surface for sealing seals 40, 44, and 46 to rotational disk 20 to prevent a fluid from leaking.

In one embodiment, outlet port seals 40, outer seal 44 and inner seal 46 are positioned within recesses 42 and 48 in the respective first body member 14 and second body member 16, as best shown in FIG. 4, so that the forces exerted on the outer seal 44 and inner seal 46 by the rotational disk 20 and first valve body member 14 are approximately equal to the forces exerted on the outlet port seals by the rotational disk and second valve body member 16. This balancing of forces on the outlet port seals 40, the outer seal 44, and the inner seal 46 on opposite sides of the rotational disk will produce substantially equal frictional wear on the surfaces of the seals on each side of the rotational disk 20, so that the seals on one side of the rotational disk are not likely to undergo premature wear relative to the seals on the other side of the rotational disk as would occur if the forces on the seals were uneven. This balancing of forces on the seals thus prevents premature failure or loss of efficiency of the valve due to uneven wear of the seals.

Valve 10 may be used to transfer various fluids as described above. In one embodiment, valve 10 is used to transfer pressurized ambient air used in a conventional airlift system by receiving ambient air at inlet port 28 and using rotational disk 20 to transfer the air flow to one of many different end points within a single system (not shown) coupled to outlet ports 12. Valve 10, configured as shown in the figures and described above, is capable of controlling an airlift system having several individual airlift elements using a flow of ambient air, by directing the air flow to various system elements through particular outlet ports 12. Valve 10 may be operated using a controller to control through which outlet port 12 a fluid is sent. The controller may be a remote control device; a micro-controller, which may or may not be programmable; a computer; or other control device. In addition, the controller may contain a readout display capable of indicating the outlet port 12 with which aperture 22 is aligned. To determine a reference position of the rotational disk and the aperture 22 on that disk, the stepper motor 56 is operated until the sensor 70 detects the sensing element 60, thereby sensing a predetermined home position of the rotational disk. Thereafter, to align the aperture 22 with any selected outlet port 12, the stepper motor is commanded to move the predetermined number of steps required to position the disk with the aperture aligned with that selected outlet port.

Although the disclosed embodiment of the invention has been described in the context of receiving fluid flow from a single source and distributing that fluid to one or more alternative destinations, it should be apparent that a valve according to the present invention can also be connected and operated to receive fluid flows from multiple sources connected to corresponding ports 12 (functioning as inlet ports) and select one such fluid for distribution to the common port 28 (functioning as an outlet port). It should also be understood that the valve can also be adapted to operate with liquid flows, although parameters such as different operating pressures and possible corrosive effects of the liquids may affect the design of seals or other elements making up the valve.

The foregoing is provided for purposes of illustrating, explaining, and describing embodiments of this invention. Modifications and adaptations to these embodiments will be apparent to those skilled in the art and may be made without departing from the scope or spirit of this invention or the following claims.

What is claimed is:

1. A valve, comprising:
   a valve body comprising a first valve body member coupled to a second valve body member, the first valve body member comprising a distribution chamber in fluid communication with an inlet port for receiving the fluid and for distributing the fluid to one of a plurality of outlet ports located in the second valve body member; and the second valve body member comprising a plurality of outlet ports;
   a rotational disk positioned in the valve body between the inlet port and the plurality of outlet ports for directing the fluid from the distribution chamber to an outlet port;
   at least one seal positioned between the rotational disk and the first valve body member for sealing the rotational disk to the first valve body member; and
   at least one outlet port seal positioned between the rotational disk and the second valve body member; and
   further comprising a housing for protecting the first valve body member and the second valve body member.

2. The valve as set forth in claim 1, further comprising a motor for rotating the rotational disk.

3. The valve as set forth in claim 2, wherein the motor is a stepper motor.

4. The valve as set forth in claim 1, wherein the at least one seal positioned between the rotational disk and the first valve body member comprises an o-ring.

5. The valve as set forth in claim 1, wherein the at least one seal positioned between the rotational disk and the first valve body member is positioned within at least one recess in the first valve body member.

6. The valve as set forth in claim 1, wherein the at least one outlet port seal comprises an o-ring.

7. The valve as set forth in claim 1, wherein the outlet ports of the second valve body member are positioned equidistant from a point on the second valve body member.

8. The valve as set forth in claim 1, wherein the rotational disk further comprises at least one aperture through which the fluid may flow from a top surface of the rotational disk to a bottom surface of the rotational disk.

9. The valve as set forth in claim 8, further comprising a sensor for positioning the at least one aperture so that a fluid may flow from the first valve body member, through the rotational disk, and into at least one outlet port.

10. The valve as set forth in claim 9, wherein the sensor comprises a hall effect sensor.

11. The valve as set forth in claim 1, wherein the outlet ports of the second valve body member are capable of being coupled with a conduit.

12. A The valve as set forth in claim 1, wherein the distribution chamber comprises a toroidal shape.

13. A valve, comprising:
   a valve body comprising a first valve body member coupled to a second valve body member, the first valve body member comprising a distribution chamber in fluid communication with an inlet port for receiving the fluid and for distributing the fluid to one of a plurality of outlet ports located in the second valve body member; and the second valve body member comprising a plurality of outlet ports;
   a rotational disk positioned in the valve body between the inlet port and the plurality of outlet ports for directing the fluid from the distribution chamber to an outlet
   at least one seal positioned between the rotational disk and the first valve body member for sealing the rotational disk to the first valve body member;
   at least one outlet port seal positioned between the rotational disk and the second valve body member; and
   the at least one seal positioned between the rotational disk and the first valve body member comprises a Y-shaped cross-section having first and second mutually diverging elements extending from a base element disposed between the rotational disk and the first valve body member, with one divergent element sealingly contacting the rotational disk and the other divergent element sealingly contacting the first valve body.

14. A valve, comprising:
   a valve body comprising a first valve body member coupled to a second valve body member, the first valve body member comprising a distribution chamber in fluid communication with an inlet port for receiving the fluid and for distributing the fluid to one of a plurality of outlet ports located in the second valve body member; and the second valve body member comprising a plurality of outlet ports;
   a rotational disk positioned in the valve body between the inlet port and the plurality of outlet ports for directing the fluid from the distribution chamber to an outlet port;
   at least one seal positioned between the rotational disk and the first valve body member for sealing the rotational disk to the first valve body member;
   at least one outlet port seal positioned between the rotational disk and the second valve body member; and
   the at least one outlet port seal comprises a Y-shaped cross-section having first and second mutually diverging elements extending from a base element disposed between the rotational disk and the second valve body member, with one divergent element sealingly contacting the rotational disk and the other divergent element sealingly contacting the second valve body.

15. A valve, comprising:

a valve body comprising a first valve body member coupled to a second valve body member, the first valve body member comprising a distribution chamber in fluid communication with an inlet port for receiving the fluid and for distributing the fluid to one of a plurality of outlet ports located in the second valve body member; and the second valve body member comprising a plurality of outlet ports;

a rotational disk positioned in the valve body between the inlet port and the plurality of outlet ports for directing the fluid from the distribution chamber to an outlet port;

at least one inner seal positioned between the rotational disk and the first valve body member for sealing the rotational disk to the first valve body member, the at least one inner seal having an outside diameter less than an inside diameter of the distribution chamber;

at least one outer seal positioned between the rotational disk and the first valve body member for sealing the rotational disk to the first valve body member, the at least one outer seal having an inside diameter greater than an outside, diameter of the distribution chamber; and at least one outlet port seal positioned between the rotational disk and the second valve body member.

16. The valve as set forth in claim 15, wherein the at least one inner seal comprises a Y-shaped cross-section.

17. The valve as set forth in claim 15, wherein the at least one outer seal comprises a Y-shaped cross-section.

18. The valve as set forth in claim 15, wherein the at least one outlet port seal comprises a Y-shaped cross-section.

19. The valve as set forth in claim 15, wherein the at least one inner seal is positioned within at least one recess in the first valve body member.

20. The valve as set forth in claim 15, wherein the at least one outer seal is positioned within at least one recess in the first valve body member.

21. The valve as set forth in claim 15, wherein the at least one outlet port seal is positioned within at least one recess in the second valve body member.

22. A valve, comprising:

a valve body comprising a first valve body member coupled to a second valve body member, the first valve body member comprising a distribution chamber in fluid communication with an inlet port for receiving the fluid and for distributing the fluid to one of a plurality of outlet ports located in the second valve body member; and the second valve body member comprising a plurality of outlet ports;

a rotational disk positioned in the valve body between the inlet port and the plurality of outlet ports for directing the fluid from the distribution chamber to an outlet port;

at least one outer seal positioned between the rotational disk and the first valve body member for sealing the rotational disk to the first valve body member, the at least one outer seal having an inside diameter greater than an outside diameter of the distribution chamber; and at least one outlet port seal positioned between the rotational disk and the second valve body member.

23. A valve, comprising:

a valve body comprising a first valve body member coupled to a second valve body member, the first valve body member comprising a distribution chamber in fluid communication with an inlet port for receiving the fluid and for distributing the fluid to one of a plurality of outlet ports located in the second valve body member; and the second valve body member comprising a plurality of outlet ports;

a rotational disk positioned in the valve body between the inlet port and the plurality of outlet ports for directing the fluid from the distribution chamber to an outlet port;

at least one seal positioned between the rotational disk and the first valve body member and exerting force on one surface of the rotational disk for sealing the rotational disk relative to the first valve body member;

outlet port seals positioned between the rotational disk and each of the plural outlet ports of the second valve body member and exerting forces on an opposite surface of the rotational disk for sealing the rotational disk relative to the second valve body member; and the force exerted on the one surface of the rotational disk by the at least one seal is substantially equal to the forces exerted on the other surface of the rotational disk by the outlet port seals, so that the seals on each side of the rotational disk will undergo substantially equal frictional wear.

* * * * *